US007677551B2

(12) United States Patent
Kawashima et al.

(10) Patent No.: US 7,677,551 B2
(45) Date of Patent: Mar. 16, 2010

(54) DOCUMENT CONVEYING APPARATUS

(75) Inventors: Shinsuke Kawashima, Osaka (JP); Katsuhiro Yoshiuchi, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 80 days.

(21) Appl. No.: 11/714,209

(22) Filed: Mar. 6, 2007

(65) Prior Publication Data
US 2007/0216083 A1  Sep. 20, 2007

(30) Foreign Application Priority Data
Mar. 15, 2006  (JP)  ............... 2006-070548
Jul. 21, 2006   (JP)  ............... 2006-199053

(51) Int. Cl.
*B65H 3/14* (2006.01)
*G03G 21/20* (2006.01)
(52) U.S. Cl. .................. 271/97; 271/98; 399/92
(58) Field of Classification Search ............ 271/97, 271/98, 309, 90, 195, 211; 399/367, 92, 399/405
See application file for complete search history.

(56) References Cited

U.S. PATENT DOCUMENTS

| 4,963,942 | A | * | 10/1990 | Aoki ................. 399/335 |
| 5,092,576 | A | * | 3/1992  | Takahashi et al. ..... 271/3.11 |
| 5,478,066 | A | * | 12/1995 | Yoshida et al. ........ 271/12 |
| 6,082,720 | A | * | 7/2000  | Ducloux et al. ........ 267/221 |
| 6,669,187 | B1 | * | 12/2003 | Clark ................. 271/98 |
| 6,863,272 | B2 | * | 3/2005  | DiNatale et al. ........ 271/97 |
| 6,954,602 | B2 | * | 10/2005 | Kimizuka ............. 399/92 |
| 7,194,222 | B2 | * | 3/2007  | Murooka .............. 399/92 |
| 7,364,150 | B2 | * | 4/2008  | Nakane ............... 271/97 |
| 7,415,219 | B2 | * | 8/2008  | Kawamata ............. 399/92 |

FOREIGN PATENT DOCUMENTS

| JP | 9-165144    | 6/1997 |
| JP | 2947855     | 7/1999 |
| JP | 2005-200152 | 7/2005 |

* cited by examiner

*Primary Examiner*—Patrick H Mackey
*Assistant Examiner*—Luis Gonzalez
(74) *Attorney, Agent, or Firm*—Smith, Gambrell & Russell, LLP

(57) ABSTRACT

A document conveying apparatus (1) includes a conveying unit (30) inside a document feeding section (10), and the conveying unit (30) includes two fans (34) for cooling the inside of the document conveying apparatus (1). The fans (34) are arranged to pass air from upstream to downstream with respect to the document conveying direction. Thus, the stream of air produced by the fan (34) flows along the document conveying direction so that a document sheet is conveyed without being affected by a braking effect. Moreover, the air stream produced by the fan (34) flows along the document conveying passage (13) both on the air intake side and the air exhaust side of the fan (34). This facilitates the conveying of a document sheet by pulling it on the air intake side of the fan (34) and pushing it on the air exhaust side of the fan (34).

6 Claims, 9 Drawing Sheets

DOCUMENT CONVEYING APPARATUS

This application is based on Japanese Patent Application No. 2006-070548 filed on Mar. 15, 2006 and Japanese Patent Application No. 2006-199053 filed on Jul. 21, 2006, the contents of both of which are hereby incorporated by reference.

BACKGROUND OF THE INVENTION

1. Field of the Invention

The present invention relates to a document conveying apparatus that can be applied to image forming apparatuses such as copiers and facsimile machines.

2. Description of Related Art

Some image forming apparatuses, such as copiers and facsimile machines, are provided with a document conveying apparatus that automatically feeds a plurality of document sheets to a document reading section. The document conveying apparatus separates and conveys one document sheet after another from the topmost layer of a stack of document sheets stacked on a document stacking tray. The image data on the surface of the document sheets is read by the document reading section, and then the document sheets are ejected into a document ejection tray provided on the downstream end of a document conveying passage.

To feed document sheets from the document stacking tray to the document conveying passage leading to the document reading section, feed members are used such as a feed roller and a feed belt. Such feed members are provided in the downstream portion of the document stacking tray with respect to the document conveying direction, and are pressed onto the topmost layer of the stack of document sheets to feed them to the downstream side with respect to the document conveying direction. Along the document conveying passage, conveying rollers and follower rollers for conveying document sheets are arranged at different positions. A document sheet is passed through nips formed by those conveying rollers and follower rollers pressing against each other, and is thereby conveyed.

In the document conveying apparatus constructed as described above, in the document reading section, the image data on the surface of a document sheet is read by the document reading apparatus as a result of the document sheet coming into contact with or close to the document reading apparatus. Here, inconveniently, the document sheet tends to adhere to a glass portion in the surface of the document reading apparatus. Conventionally, this makes it difficult to separate the document sheet from the glass portion, resulting in lowered conveying performance. To overcome such inconvenience, there has been proposed a construction that facilitates separation of a document sheet from the surface of a document reading apparatus. JP-A-2005-200152 discloses an example of such a construction. In the document feeding apparatus (document conveying apparatus) disclosed in JP-A-2005-200152, a stream of air produced by a fan is blown, from the downstream side with respect to the document conveying direction, onto a platen glass disposed in the reading portion of the document reading apparatus.

The document feeding apparatus (document conveying apparatus) disclosed in JP-A-2005-200152 employs an air stream at the reading portion of the document reading apparatus to facilitate the separation of the document sheet from the platen glass. Thus, from the perspective of preventing the document sheet from adhering to the platen glass, conveying performance is improved. However, the air stream is blown to the document reading apparatus from the downstream side with respect to the document conveying direction, and thus the air stream produces a braking effect on the document sheet. Thus, from the perspective of the very conveying of the document sheet, conveying performance cannot well be said to be improved effectively.

A document sheet may make contact with the conveying rollers, follower rollers, conveying guide members and the like built in the document conveying apparatus, thereby scattering paper powder, toner from the image formed on the document sheet and other particles inside the apparatus. Here, if, as in the document feeding apparatus (document conveying apparatus) disclosed in JP-A-2005-200152, a stream of air is blown from the downstream side with respect to the document conveying direction, the paper powder and toner may fly around inside the apparatus. Thus, the paper powder and toner may adhere to the drive mechanism of the conveying rollers, further lowering the document conveying performance of the apparatus; also the paper powder and toner may adhere to the document reading section, lowering the accuracy with which to read the document sheet. This may greatly affect the quality of the image produced by the image forming apparatus.

On the other hand, there has been proposed, in a document conveying apparatus, separating means that separates, with a stream of air, one document sheet after another from document sheets stacked on a document stacking tray. Here, sheet separation is achieved by blowing a stream of air, from the side of the stack of document sheets, to the downstream-side end face of the stack of document sheets with respect to the document conveying direction and by making float the topmost layer of the stack of document sheets. JP-B-2947855 and JP-A-H09-165144 disclose examples of document conveying apparatuses that in that way facilitate separation of document sheets stacked on top of each other.

Both the automatic document feeding apparatus disclosed in JP-B-2947855 and the automatic document conveying apparatus disclosed in JP-A-H09-165144 blow air to the stack of document sheets stacked on the document stacking tray to facilitate separation of the document sheets as they are fed into the apparatus, thus enhancing paper feed performance. The air stream here is, however, only used to facilitate separating the document sheets as they are fed into the apparatus, and is not used to separate a document sheet from the platen glass or to enhance conveying performance otherwise. Thus, the construction and electric power required to produce the air stream are not used efficiently.

Document conveying apparatuses often incorporate a double-sided document reading apparatus and other components as well as a motor for driving a conveying roller and the control circuit board therefore. An undue rise in temperature due to accumulated heat inside the document conveying apparatus may adversely affect the image formed on the document sheet, the control circuit board and the document reading apparatus, lowering the accuracy with which data is read from the document sheet. Thus, the inside of the document conveying apparatus needs to be cooled efficiently.

SUMMARY OF THE INVENTION

An object of the present invention is to provide a document conveying apparatus that can cool its own inside efficiently with a fan, and that in addition can enhance document conveying performance effectively, leading to greatly enhanced document conveying stability.

To achieve the above object, according to the invention, in a document conveying apparatus that separates and conveys one document sheet after another from a stack of document sheets placed on a document stacking tray to permit image data to be read from a document surface, a fan is arranged at such an orientation as to pass air from an upstream side to a downstream side with respect to the document conveying direction to cool the inside of the document conveying apparatus, and the air flows along a document conveying passage on an air intake side and/or an air exhaust side of the fan.

With this construction, the air stream produced by the fan flows along the document conveying direction so that the document sheet is conveyed without being affected by a braking effect. Moreover, it is possible to facilitate the conveying of the document sheet by pulling it on the air intake side of the fan and by pushing it on the air exhaust side of the fan. Furthermore, it is possible to actively discharge, with the fan, paper powder and toner scattered inside the document conveying apparatus out of the apparatus. Thus, it is possible to provide a document conveying apparatus that can cool its own inside efficiently, and that in addition can enhance document conveying performance effectively, leading to greatly enhanced document conveying stability.

According to the invention, in the document conveying apparatus constructed as described above, the fan is arranged so that the air flows along the document conveying passage on the air intake side of the fan and the air exhaust side of the fan points to the downstream-side end face of the stack of document sheets placed on the document stacking tray.

With this construction, it is possible to blow the air stream produced by the fan onto the end face of the stack of document sheets. This facilitates separation of the document sheets, thus enhancing feeding performance. Hence, the air stream produced by the fan is used to enhance document conveying performance and also to facilitate separation of the document sheets as they are fed into the apparatus.

According to the invention, in the document conveying apparatus constructed as described above, an exhaust louver is provided on a wall portion located in the downstream-side vicinity of the downstream-side end face of the stack of document sheets, the exhaust louver permitting the air discharged from the fan to be directed to the downstream-side end face of the stack of document sheets placed on the document stacking tray.

With this construction, the air stream produced by the fan can more easily flow toward the end face of the stack of document sheets. This makes it possible to blow the air vigorously onto the end face of the stack of document sheets, thereby further facilitating separation of the document sheets. This helps achieve enhanced sheet conveying performance as the document sheets are fed into the apparatus.

According to the invention, in the document conveying apparatus constructed as described above, at least part of the air discharged toward the downstream-side end face of the stack of document sheets placed on the document stacking tray is passed to a document ejection port located at the downstream end of the document conveying passage to permit the document sheet to be ejected therethrough into a document ejection tray.

With this construction, it is possible to actively push, with the air discharged from the fan, the document sheet into the document ejection tray through the document ejection port. Thus, it is possible to prevent inconveniences such as one in which, when a document sheet is about to be ejected, it gets stuck in the document ejection port and is caught on an ejection roller or the like disposed nearby to be eventually broken by being pulled in an unintended direction. Hence, it is possible to achieve enhanced feeding performance when the document sheets are fed into the apparatus, and also to prevent the document sheet from breaking at the document ejection port.

According to the invention, in the document conveying apparatus constructed as described above, the fan has an inlet thereof pointing to part of the document surface lying in contact with the outer circumferential surface of a conveying roller located on the air intake side of the fan.

With this construction, the suction by the fan permits the document sheet to attach to the conveying roller. This increases the degree of attachment of the document sheet to the conveying roller, and thus permits the document sheet to be conveyed by the conveying roller without sliding thereon. Thus, it is possible to further enhance document conveying performance.

According to the invention, in the document conveying apparatus constructed as described above, the conveying roller includes a plurality of conveying rollers arranged in a document sheet width direction perpendicular to the document conveying direction, and the fan is arranged to pass air between two adjacent ones of the conveying rollers.

With this construction, it is possible to make the document sheet attach to the conveying roller in an area closer to where the conveying roller makes contact with the document sheet. This makes it possible to more intimately attach the document sheet to the conveying roller, thus further enhancing document conveying performance.

According to the invention, in the document conveying apparatus constructed as described above, the outlet of the fan points to a document ejection port located at the downstream end of the document conveying passage to permit the document sheets to be ejected therethrough into a document ejection tray.

With this construction, it is possible to actively push, with the air discharged from the fan, the document sheet into the document ejection tray through the document ejection port. Thus, it is possible to prevent inconveniences such as one in which, when a document sheet is about to be ejected, it gets stuck in the document ejection port and is caught on an ejection roller or the like disposed nearby to be eventually broken by being pulled in an unintended direction. Hence, it is possible to achieve enhanced document conveying performance, and also to prevent the document sheet from breaking at the document ejection port.

According to the invention, in the document conveying apparatus constructed as described above, an exhaust duct is provided to permit the air discharged from the fan to be directed to the document ejection port.

With this construction, it is possible to more actively push the document into the document ejection tray through the document ejection port. This helps enhance the effect of preventing the document sheet from breaking at the document ejection port.

According to the invention, in the document conveying apparatus constructed as described above, the document stacking tray and the document ejection tray are arranged over each other, with respective document conveying directions thereof pointing in mutually opposite directions, the document feed port through which to feed the document sheet out of the document stacking tray and the document ejection port through which to eject the document sheet into the document ejection tray are formed on the same side of the document stacking tray and the document ejection tray respectively with respect to a document reading section, and the document conveying passage running from the document feed port to the document ejection port is curved to form a U-shape in an up and down direction.

With this construction, in the document conveying apparatus designed to be compact in the manner described above, it is possible not only to cool the inside of the apparatus efficiently, but also to enhance document conveying performance effectively. Thus, it is possible to greatly enhance document conveying stability.

DETAILED DESCRIPTION OF PREFERRED EMBODIMENTS

Hereinafter, embodiments of the present invention will be described with reference to FIGS. 1 to 9.

Figure 1:
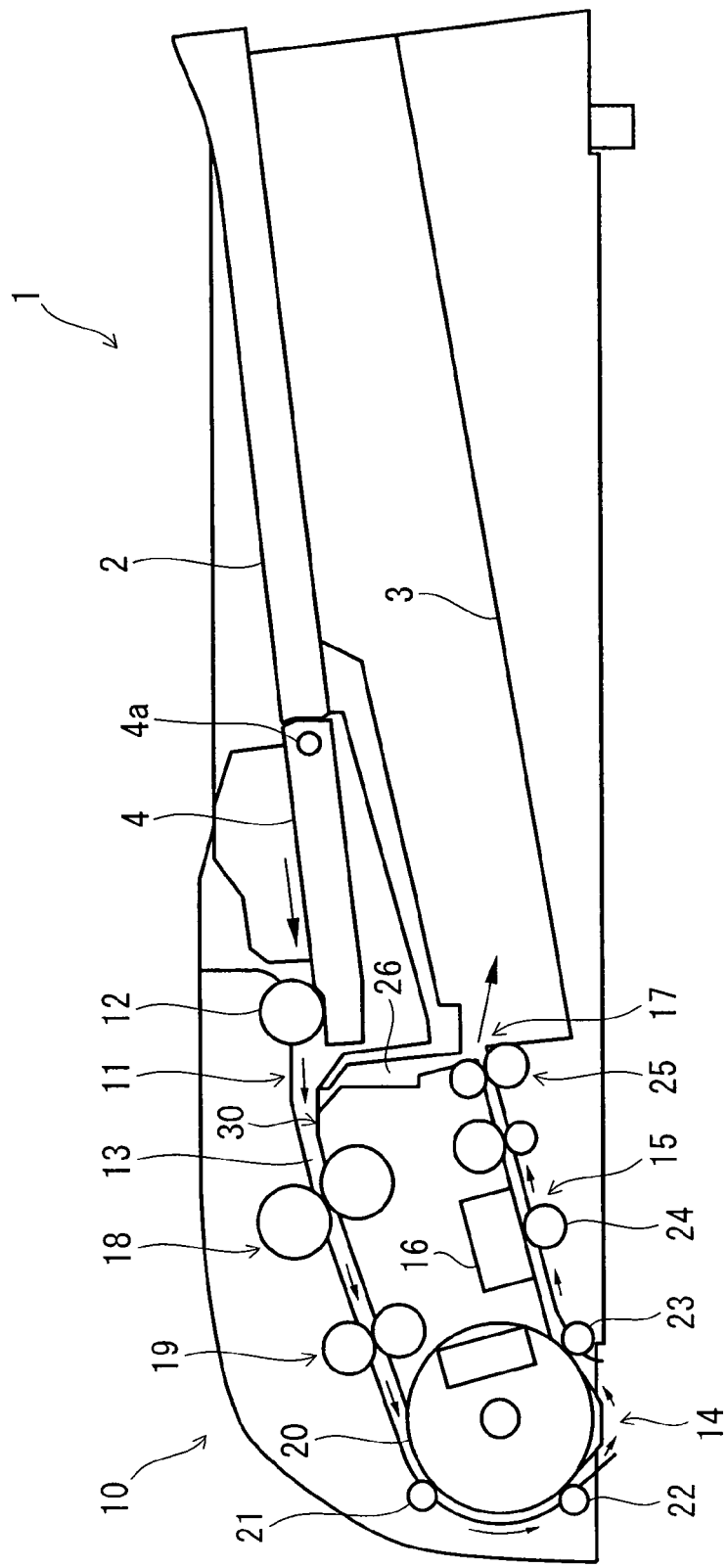
FIG. 1 is a schematic vertical cross-sectional front view of a document conveying apparatus of a first embodiment of the invention.

First, an outline description will be given of the construction of a document conveying apparatus of a first embodiment according to the invention with reference to FIG. 1. FIG. 1 is a schematic vertical cross-sectional front view of the document conveying apparatus. Solid line arrows in FIG. 1 represent the passage and the direction through and in which a document sheet is conveyed. It is assumed that the hereindescribed document conveying apparatuses embodying the invention are designed as those to be mounted in an upper portion of an image forming apparatus such as a copier or a facsimile machine, or of a multifunctional device having copying, facsimile and other capabilities.

As shown in FIG. 1, the document conveying apparatus 1 is provided with a document stacking tray 2, a document feeding section 10 and a document ejection tray 3.

The document stacking tray 2 is arranged in an upper portion of the document conveying apparatus 1. Document sheets can be placed on the document stacking tray 2 from above and be stacked thereon. The document stacking tray 2 is formed to have a slope extending from upstream to downstream with respect to the document conveying direction, that is, a slope slanted from right to left in FIG. 1.

In a downstream portion of the document stacking tray 2 with respect to the document conveying direction, a lift member 4 is formed. The lift member 4 is formed of a plate-shaped member such that its surface coincides with the surface of the document stacking tray 2 where document sheets are placed. The lift member 4 is so formed as to be rotatable in a vertical plane about a pivot shaft 4a provided in the upstream end thereof, the downstream end thereof being a free end. The lift member 4 is driven to rotate about the pivot shaft 4a with an unillustrated motor to apply to the lift member 4 a force acting in an upward direction such that the downstream end of the document sheets stacked on the document stacking tray 2 constantly makes contact with a feed roller 12 arranged above the document sheets.

The document feeding section 10 is provided with a document feed port 11 and the feed roller 12 on the downstream end of the document stacking tray 2 with respect to the document conveying direction. The feed roller 12 separates and feeds one document sheet after another from the topmost layer of the document sheets stacked on the document stacking tray 2. On the downstream side of the document feed port 11, a document conveying passage 13 runs into the document conveying section 10.

The document conveying passage 13 reaches the bottom surface of the document conveying apparatus 1 where a first document reading section 14 is provided. While the document sheet fed into the first document reading section 14 is further conveyed along the document conveying passage 13 to the downstream side thereof, that is, while it is conveyed from the left side to the right side of the first document reading section 14 as seen in FIG. 1, image data is read from a first face of the document sheet, i.e., the lower face thereof, by a document reading apparatus (unillustrated, hereinafter referred to as the first document reading apparatus) that is provided below the document reading section 14 inside the image forming apparatus main body.

On the downstream side of the first document reading section 14 with respect to the document conveying passage 13, a second document reading section 15 is provided. In a case where image data needs to be read from both faces of the document sheet, while the document sheet fed into the second document reading section 15 is further conveyed along the document conveying passage 13 to the downstream side thereof, that is, while it is conveyed from the left side to the right side of the second document reading section 15 as seen in FIG. 1, image data is read from a second face of the document sheet, i.e., the upper face thereof, by a second document reading apparatus 16 provided above the second document reading section 15.

At the downstream end of the document conveying passage 13, a document ejection port 17 is formed. The document sheet from which image data has been read is ejected into a document ejection tray 3 through the document ejection port 17.

The document ejection tray 3 is arranged immediately below the document stacking tray 2. The document stacking tray 2 is mounted on top of the document ejection tray 3. The document sheet ejected into the document ejection tray 3 can be taken out at the front side of the document conveying apparatus 1 (see FIG. 7).

The document stacking tray 2 and the document ejection tray 3 convey document sheets in opposite directions. Specifically, as seen in FIG. 1, the document stacking tray 2 feeds the document sheets to the left; the document ejection tray 3 feeds them to the right. Thus, the document feed port 11 and the document ejection port 17 are formed at the same side of the trays with respect to the first reading section 14, that is, at the left side of the trays as seen in FIG. 1. The document conveying passage 13 running from the document feed port 11 to the document ejection port 17 is curved in a U-shape in the up/down direction.

With the construction described above, the document conveying apparatus 1 feeds the document sheets placed on the document stacking tray 2 into the document feeding section 10, then reads image data from the document sheets in the document reading section and then ejects them into the document ejection tray 3.

Figure 2:
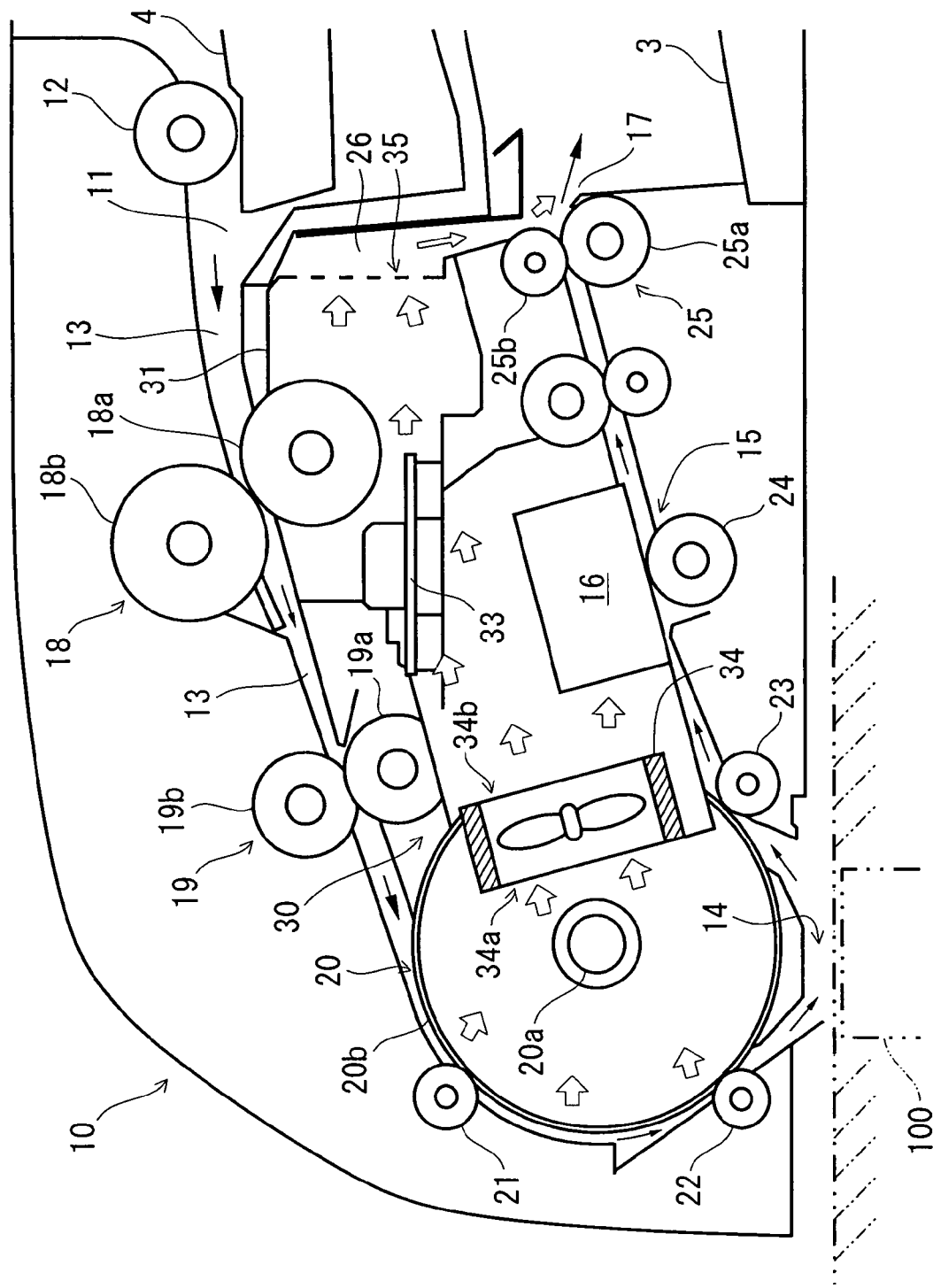
FIG. 2 is a schematic vertical cross-sectional front view showing a document feeding section in the document conveying apparatus shown in FIG. 1.

Next, a detailed description will be given of the construction of the document feeding section 10 in the document conveying apparatus 1 with reference to FIG. 2 as well as FIG. 1. FIG. 2 is a schematic vertical cross-sectional front view showing the document feeding section in the document conveying apparatus. In FIG. 2, solid line arrows represent the passage and the direction through and in which the document sheet is conveyed; outline arrows represent the path and the direction along and in which air is passed.

As described previously, the document feeding section 10 is provided with the document feed port 11 and the feed roller 12 on the downstream end of the document stacking tray 2 with respect to the document conveying direction (see FIG. 2). The feed roller 12 is arranged substantially in the middle of the document sheet in the width direction thereof perpendicular to the document conveying direction (see FIG. 7). The feed roller 12 is pressed onto the topmost layer of the document sheets stacked on the document stacking tray 2 to feed it to the downstream side of the feed roller 12. On the downstream side of the document feed port 11, the document conveying passage 13 runs obliquely downward.

As shown in FIG. 2, on the document conveying passage 13, a separating roller 18a and a paper feed roller 18b that are pressed onto each other are provided on the immediate downstream side of the document feed port 11. The separating roller 18a and the paper feed roller 18b separate and feed one document sheet after another received from the feed roller 12 to the first document reading section 14 located on the downstream side thereof.

On the downstream side of a pair of conveying rollers 18, a pair of resist rollers 19 is provided. The pair of resist rollers 19 is composed of a resist roller 19a and a follower roller 19b that are pressed onto each other. The pair of resist rollers 19 feeds a document sheet to the first document reading section 14 while correcting slanted feeding of the document sheet so that image data can be accurately read.

On the downstream side of the pair of resist rollers 19, relatively large-diameter conveying rollers 20 are provided. Here, the document conveying passage 13 runs along the outer circumferential surface of the large-diameter conveying roller 20, over about half the circumferential length thereof, before going further downward. Thus, as seen in FIG. 2, the document conveying passage 13 extends leftward on the upstream side of the large-diameter roller 20, and extends rightward on the downstream side thereof. Around the large-diameter conveying roller 20, on the document conveying passage 13, there are provided three follower rollers 21, 22 and 23 that are pressed onto the large-diameter conveying roller 20.

Between the follower rollers 22 and 23, which are two of the three follower rollers pressed onto the large-diameter conveying roller 20, the first document reading section 14 is provided. While the document sheet fed into the first document reading section 14 is further conveyed along the document conveying passage 13 to the downstream side thereof, that is, while it is conveyed from the left side to the right side of the first document reading section 14 as seen in FIG. 2, image data is read from the first face of the document sheet, i.e., the lower face thereof, by the first document reading apparatus 100, that is, the document reading apparatus provided below the document reading section 14 in the image forming apparatus main body.

On the downstream side of the first document reading section 14, further on the downstream side of the follower roller 23, the second document reading section 15 is provided. The second document reading section 15 is fitted with the second document reading apparatus 16, which includes a close-contact type image sensor, and the conveying roller 24. The second document reading apparatus 16 is provided above the document conveying passage 13 so as to face the conveying roller 24 across the document conveying passage 13. The conveying roller 24 is provided below the document conveying passage 13, and conveys the document sheet by passing it through the gap left between the conveying roller 24 and the member opposite the conveying roller 24, namely the second document reading apparatus 16. While the document sheet fed into the second document reading section 15 is further conveyed along the document conveying passage 13 to the downstream side thereof, that is, while it is conveyed from the left side to the right side of the second document reading section 15 as seen in FIG. 2, image data is read from the second face of the document sheet, i.e., the upper face thereof, by the second document reading apparatus 16 provided in an upper portion of the second document reading section 15.

On the downstream side of the second document reading section 15, at the downstream end of the document conveying passage 13, the document ejection port 17 and a pair of document ejection rollers 25 are provided. The document sheet from which image data has been read is ejected into the document ejection tray 3 (see FIG. 1) through the document ejection port 17 by the pair of document ejection rollers 25 composed of an ejection roller 25a and an ejection follower roller 25b.

In the document feeding section 10 provided in the document conveying apparatus 1 and constructed as described above, the components that are surrounded by the document conveying passage 13 extending in a U-shape in the up/down direction from the document feed port 11 to the document ejection port 17 are integrated into a single unit, namely a conveying unit 30.

Figure 3:
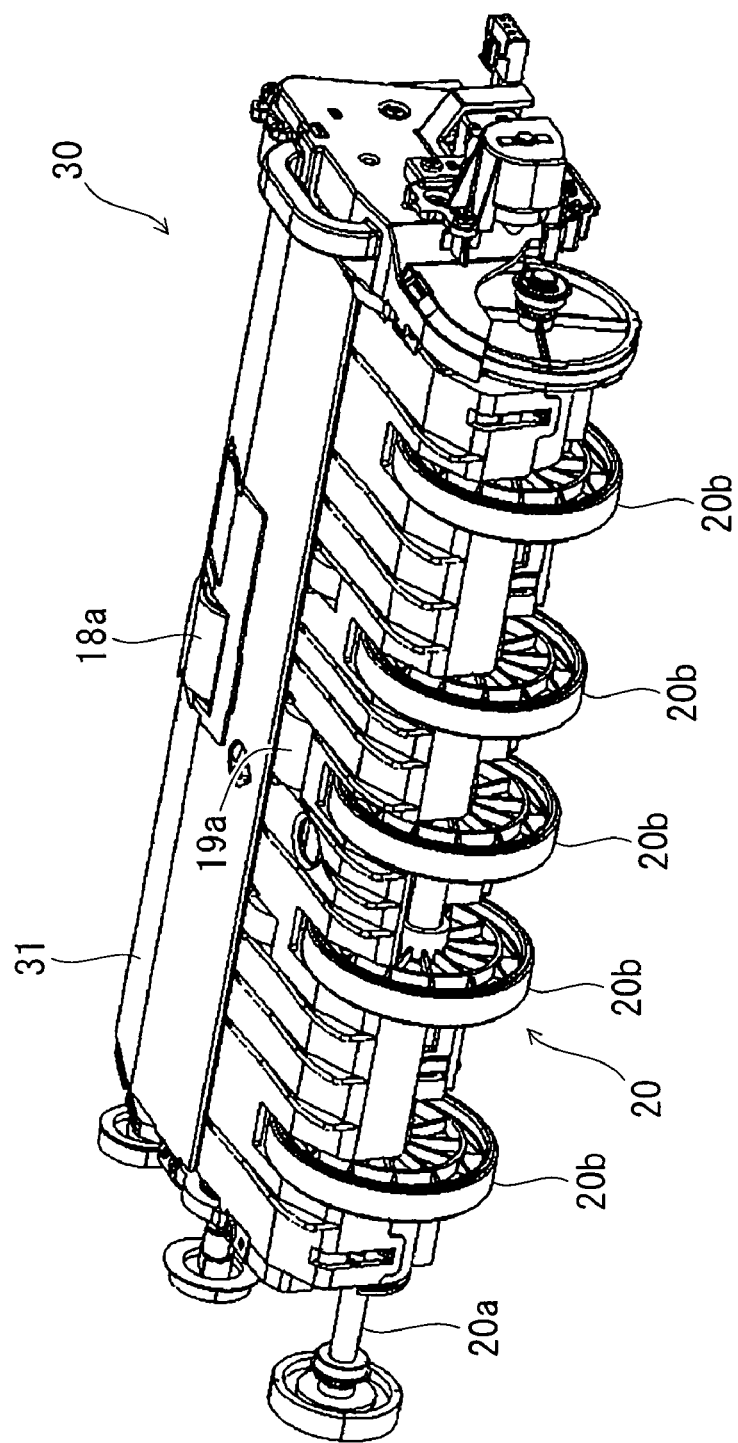
FIG. 3 is a perspective view of a conveying unit in the document feeding section, as seen from the left side of FIG. 2.
Figure 4:
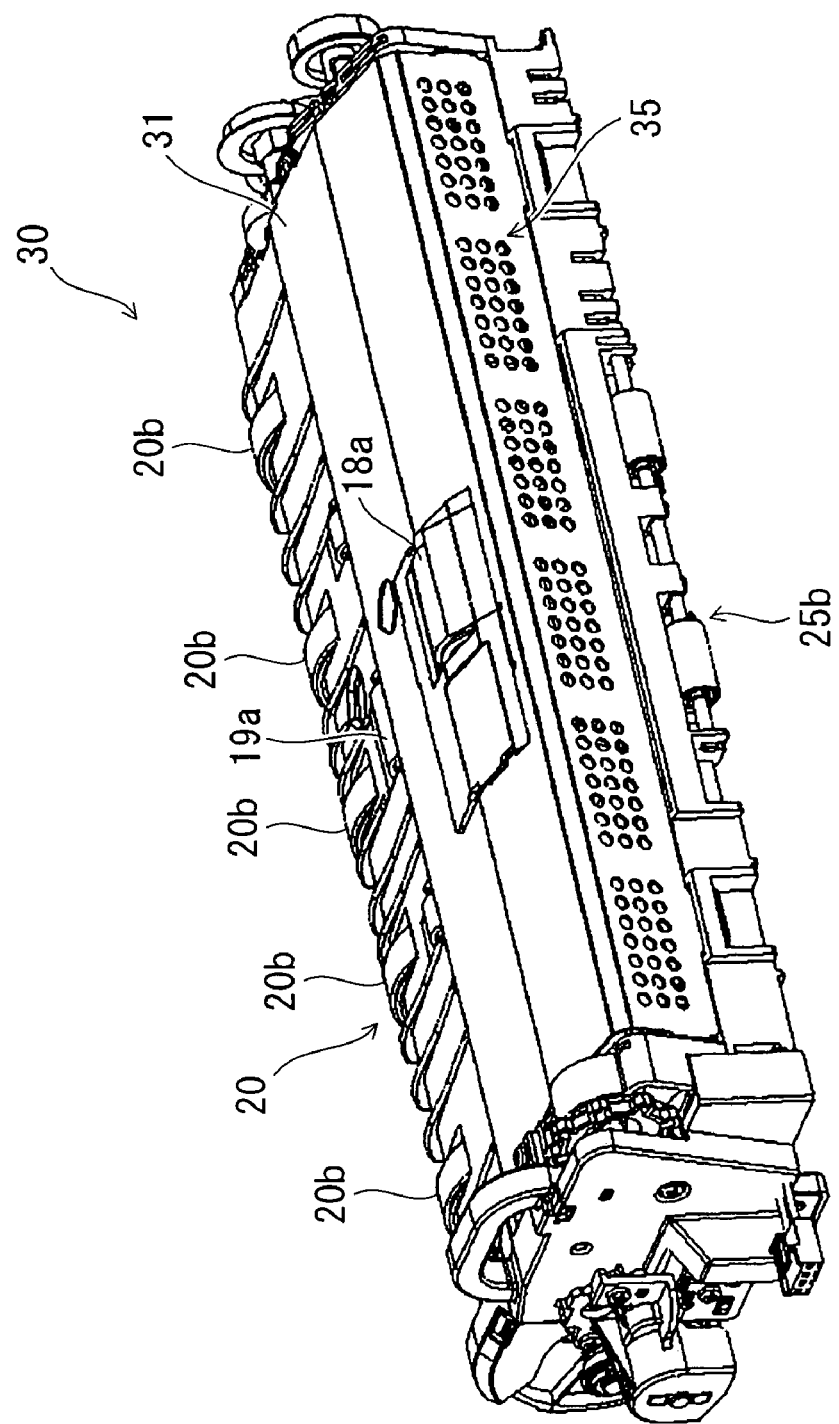
FIG. 4 is a perspective view of the conveying unit in the document feeding section, as seen from the right side of FIG. 2.
Figure 5:
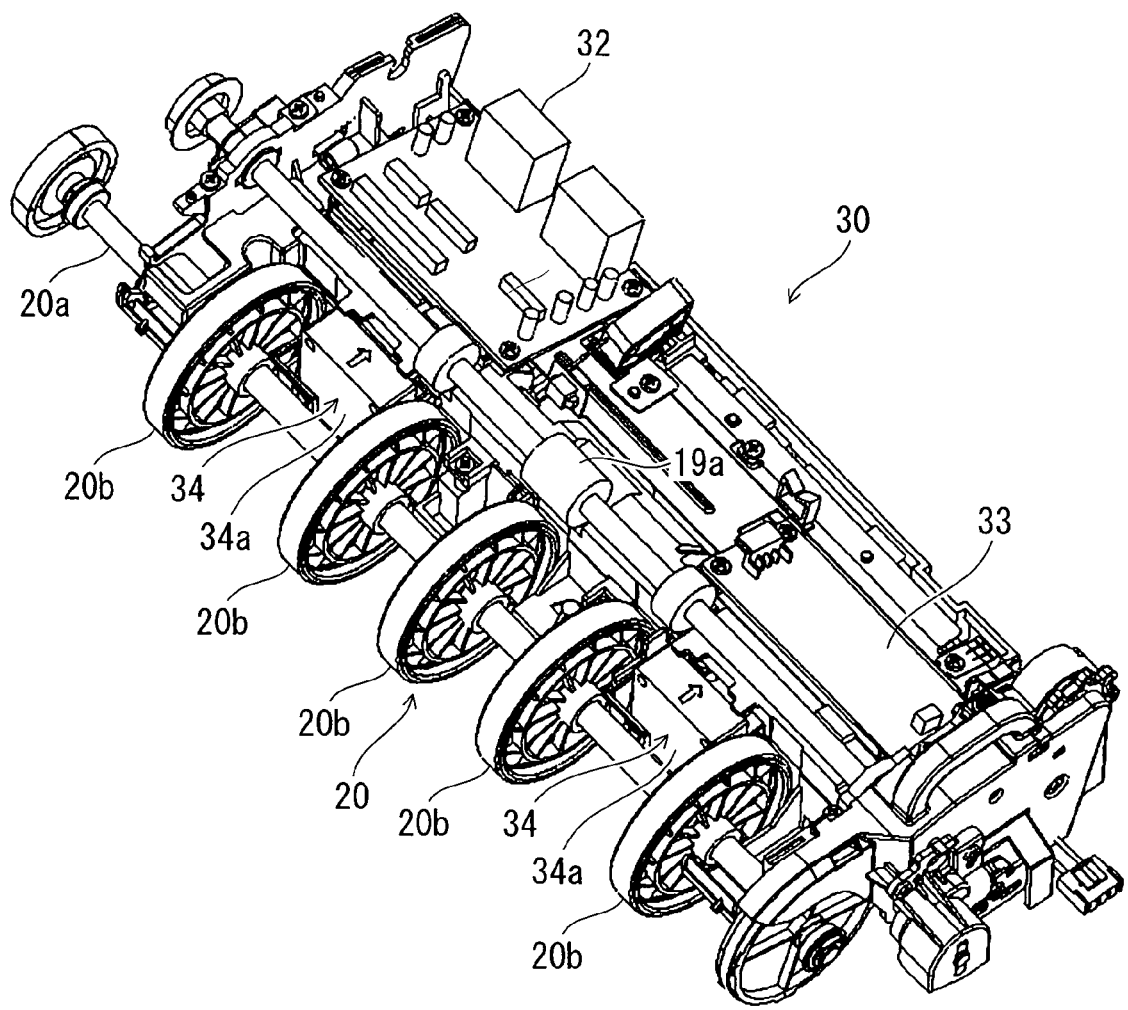
FIG. 5 is a perspective view of the conveying unit in the document feeding section, in a state where a conveying guide member is removed.

Next, a detailed description will be given of the construction of the conveying unit 30 in the document conveying apparatus 1 with reference to FIGS. 3 to 5 as well as FIG. 2. FIG. 3 is a perspective view of the conveying unit in the document feeding section shown in FIG. 2, as seen from the left side of FIG. 2. FIG. 4 is a perspective view of the conveying unit, as seen from the right side of FIG. 2. FIG. 5 is a perspective view of the conveying unit in a slate where a conveying guide member is removed.

As shown in FIGS. 3 and 4, the conveying unit 30 is a unit into which are integrated the components surrounded by the document conveying passage 13 extending in a U-shape in the up/down direction from the document feed port 11 to the document ejection port 17.

In an upper portion of the conveying unit 30, a conveying guide member 31 is provided below the part of the document conveying passage 13 around the conveying roller 18a and the resist roller 19a. The conveying unit 30 includes the large-diameter conveying roller 20 and the second document reading apparatus 16 (see FIG. 2). As shown in FIG. 3, the large-diameter conveying roller 20 is formed such that the pivot shaft 20a extending in the document sheet width direction passes through five relatively small-width rollers 20b.

With the conveying guide member 31 removed from the conveying unit 30, the interior structure of the conveying unit 30 is exposed as shown in FIG. 5. Inside the conveying unit 30, two control circuit boards 32 and 33 for controlling the second document reading apparatus 16 are arranged in an upper portion thereof. The second document reading apparatus 16 and the control circuit boards 32 and 33 generate heat as the document conveying apparatus 1 is driven.

In a portion of the conveying unit 30 on the downstream side of the large-diameter conveying roller 20 with respect to the document conveying direction, two fans 34 for cooling the inside of the document conveying apparatus 1 are provided. The two fans 34 are separately arranged, each between two adjacent rollers 20b among the five rollers 20b provided in the document sheet width direction.

As shown in FIG. 2, the fan 34 is arranged such that its inlet 34a points from inside the large-diameter conveying roller 20 provided on the air intake side of the fan 34 toward the outer circumferential surface of the large-diameter conveying roller 20 in the document conveying passage 13, i.e., toward the face of the document sheet in contact with the outer circumferential surface. Thus, as the fan 34 is driven, air flows between the two adjacent rollers 20b.

As shown in FIG. 2, the fan 34 is also arranged such that its outlet 34b points toward the second document reading apparatus 16, the two control circuit boards 32 and 33 and the document ejection port 17 located on the downstream side with respect to the document conveying direction. At the downstream end of the conveying unit 30 toward which the air discharged from the outlet 34b flows, as shown in FIGS. 2 and 4, an exhaust grill 35 is provided. The air that drives the fan 34 and is then discharged from the outlet 34b cools the second document reading apparatus 16 and the two control circuit boards 32 and 33, and is then discharged out of the conveying unit 30 through the exhaust grill 35.

As shown in FIG. 2, on the downstream side of the conveying unit 30 with respect to the direction in which the air blown by the fan 34 flows, outside the exhaust grill 35, an exhaust duct 26 is provided. The exhaust duct 26 is arranged such that the air discharged by the fan 34 through the exhaust grill 35 of the conveying unit 30 is directed to the document ejection port 17 located at the downstream end of the document conveying passage 13.

As described above, in the document conveying apparatus 1 that separates and conveys one document sheet after another from document sheets stacked on the document stacking tray 2 to permit image data to be read from the face of the document sheet, the fan 34 for cooling the inside of the apparatus is arranged at such an orientation as to pass air from upstream to downstream with respect to the document conveying direction. Thus, the direction in which the air blown by the fan 34 flows coincides with the document conveying direction, so that the document sheet can be conveyed without being affected by a braking effect. Moreover, the air blown by the fan 34 flows both on the air intake side and on the air exhaust side of the fan 34. This helps convey the document sheet by pulling it on the air intake side of the fan 34 and by pushing it on the air exhaust side of the fan 34. Furthermore, it is possible to actively discharge, with the fan 34, paper powder and toner scattered inside the document conveying apparatus 1 out of the apparatus. Thus, it is possible to provide a document conveying apparatus 1 that can cool its own inside efficiently, and that in addition can enhance the document conveying performance effectively, leading to greatly enhanced document conveying stability.

The fan 34 has the inlet 34a pointing toward the face of the document sheet in contact with the outer circumferential surface of the large-diameter conveying roller 20 provided on the air intake side of the fan 34. Thus, the suction by the fan permits the document sheet to attach to the large-diameter conveying roller 20. This increases the degree of attachment of the document sheet to the large-diameter conveying roller 20, and thus permits the document sheet to be conveyed by the large-diameter conveying roller 20 without sliding thereon. Hence, it is possible to further enhance document conveying performance.

A plurality of large-diameter conveying rollers 20 are provided in the document sheet width direction perpendicular to the document conveying direction, and the fan 34 is arranged to pass air between two adjacent rollers 20b among the rollers 20. Hence, it is possible to make the document sheet attach to the large-diameter conveying rollers 20 in an area closer to where the large-diameter conveying rollers 20 make contact with the document sheet. This makes it possible to more intimately attach the document sheet to the large-diameter conveying rollers 20, thus further enhancing document conveying performance.

Moreover, the fan 34 has the outlet 34b pointing toward the document ejection port 17 through which the document sheet is ejected into the document ejection tray 3 located on the downstream end of the document conveying passage 13. This makes it possible to further push, with the air discharged from the fan 34, the document sheet into the document ejection tray 3 through the document ejection port 17. Thus, it is possible to prevent inconveniences such as one in which, when a document sheet is about to be ejected into the document ejection tray 3, it gets stuck in the document ejection port 17 and is caught on an ejection roller 25a or the like disposed nearby to be eventually broken by being pulled in an unintended direction. Hence, it is possible to achieve enhanced feeding performance, and also to prevent the document sheet from breaking at the document ejection port 17.

Furthermore, the exhaust duct 26 is provided to permit the air discharged from the fan 34 through its outlet 34b to be directed to the document ejection port 17. Thus, it is possible to more actively push the document sheet into the document ejection tray 3 through the document ejection port 17. This helps enhance the effect of preventing the document sheet from breaking at the document ejection port 17.

Figure 6:
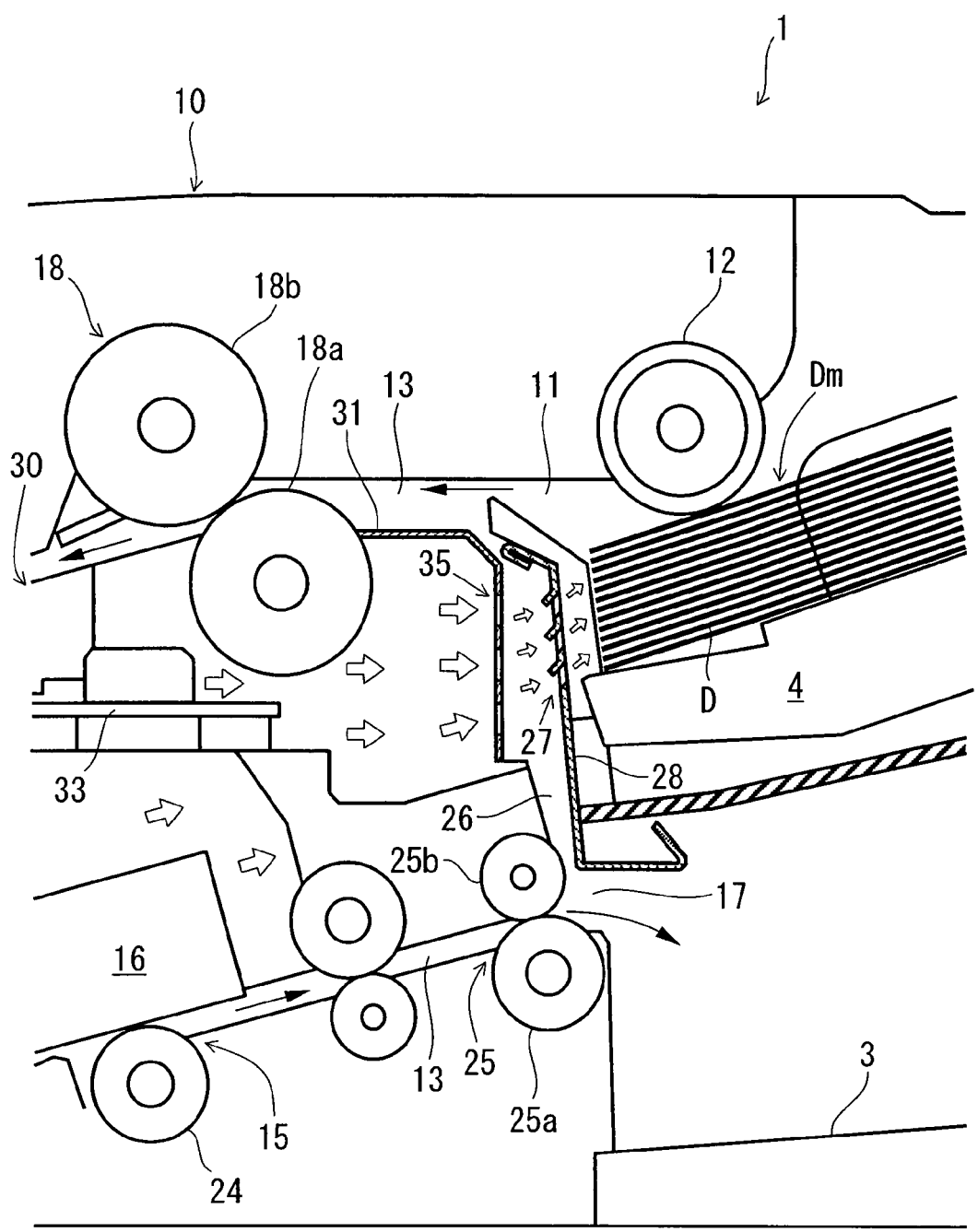
FIG. 6 is a vertical cross-sectional enlarged front view of a portion around an exhaust louver in a document conveying apparatus of a second embodiment of the invention.
Figure 7:
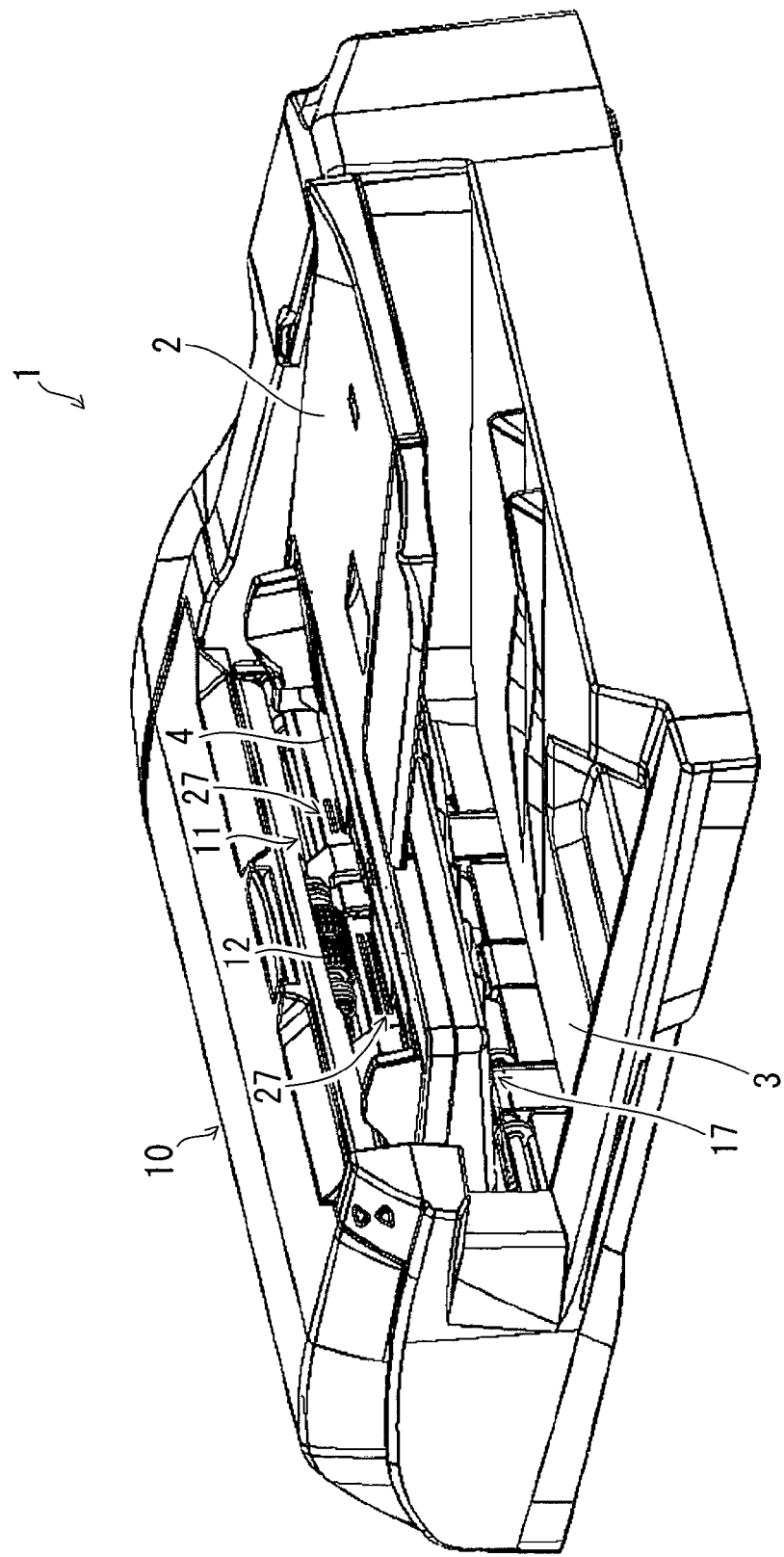
FIG. 7 is a perspective view of the document conveying apparatus shown in FIG. 6, as seen from the direction of a document stacking tray.
Figure 8:
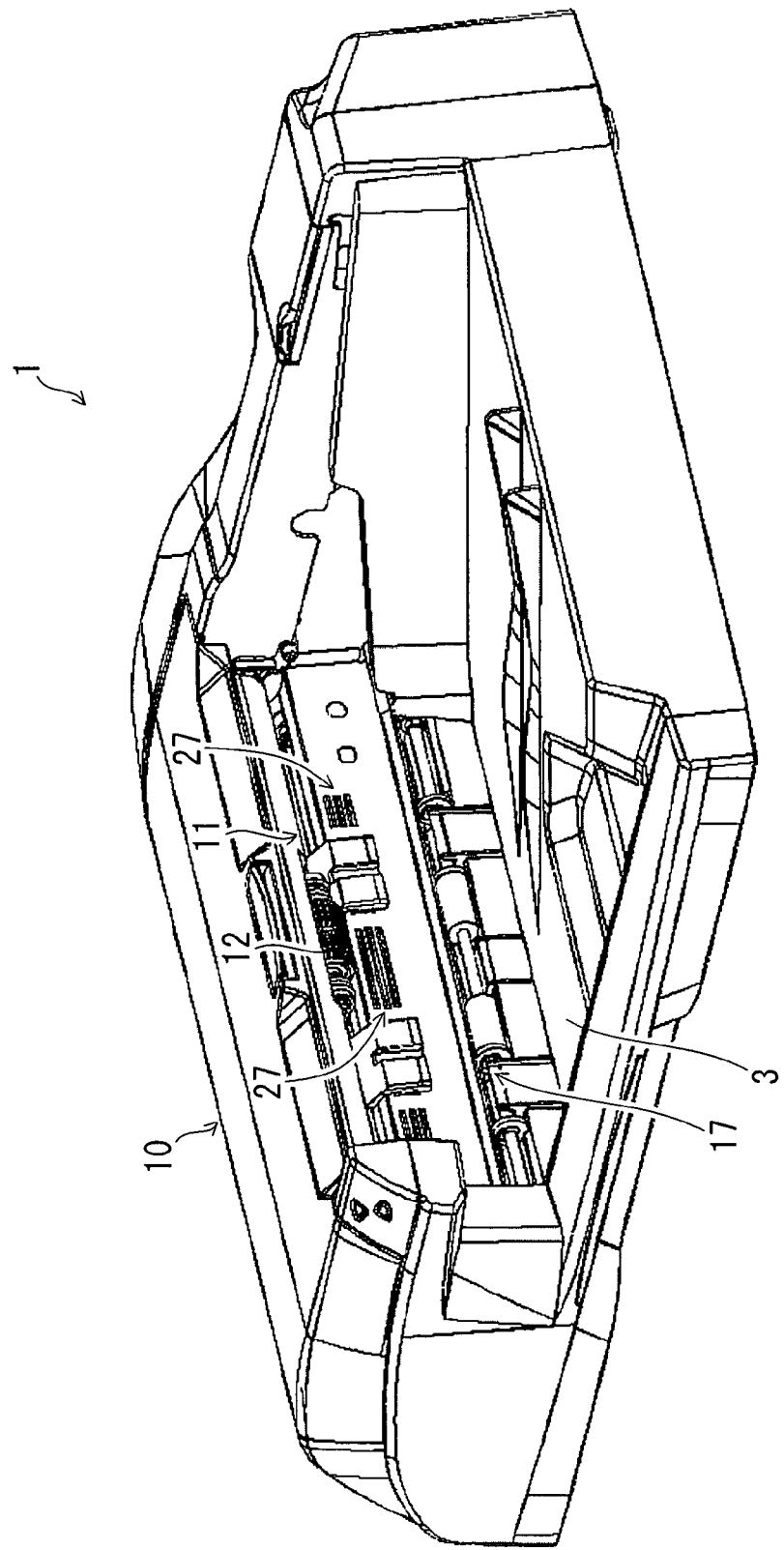
FIG. 8 is a perspective view, as seen from the direction of the document stacking tray, of the document conveying apparatus, in a state where the document stacking tray is removed.

Next, a detailed description will be given of the construction of a document conveying apparatus of a second embodiment according to the present invention with reference to FIGS. 6 to 8. FIG. 6 is a vertical cross-sectional enlarged front view of a portion around an exhaust louver in the document conveying apparatus. FIG. 7 is a perspective view of the document conveying apparatus shown in FIG. 6 as seen from the direction of the document stacking tray. FIG. 8 is a perspective view, as seen from the direction of the document stacking tray, of the document conveying apparatus in a state where the document stacking tray is removed. In FIG. 6, solid line arrows represent the passage and the direction through and in which the document sheet is conveyed; outline arrows represent the path and the direction along and in which air is passed.

The basic construction of this embodiment is the same as that of the first embodiment described with reference to FIGS. 1 to 5, and accordingly no illustration or description will be given of such components and structures as have already been discussed in connection with the first embodiment.

In the document conveying apparatus 1 of the second embodiment, on the air exhaust side of the fan 34 in the conveying unit 30, outside the exhaust grill 35, the exhaust louver 27 is provided as shown in FIG. 6.

As shown in FIG. 6, the exhaust louver 27 is provided on a wall portion 28 between the conveying unit 30 and the document stacking tray 2 so as to permit air to flow through the space between the conveying unit 30 and the document stacking tray 2. As shown in FIGS. 6 to 8, the exhaust louver 27 is arranged immediately on the downstream side of the downstream-side end face of document sheets Dm stacked on the document stacking tray 2. The exhaust louver 27 is formed to point slightly upward from the conveying unit 30 toward the document stacking tray 2 (see FIG. 6).

The exhaust louver 27 described above permits the air discharged from the outlet 34b (see FIG. 2) of the fan 34 to be discharged out of the conveying unit 30 through the exhaust grill 35, so that the air is directed to the downstream-side end face of the stack of the document sheets Dm on the document stacking tray 2.

Figure 9:
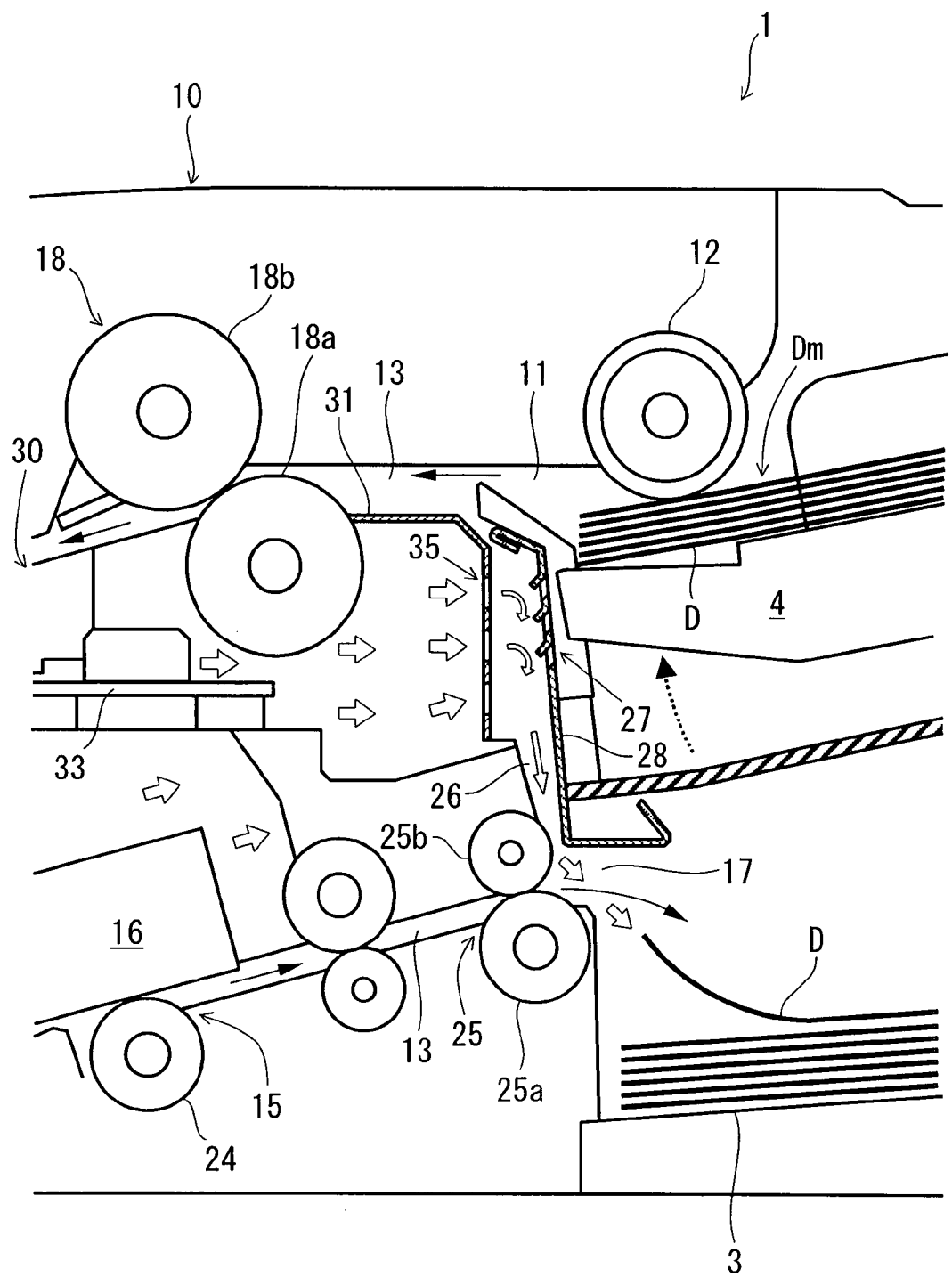
FIG. 9 is a vertical cross-sectional enlarged front view of a portion around an exhaust louver in a state where some of the document sheets shown in FIG. 6 have been conveyed.

Next, with reference to FIG. 9 as well as FIG. 6, a description will be given of how the exhaust louver 27 functions when some of the document sheets have actually been conveyed. FIG. 9 is a vertical cross-sectional enlarged front view of a portion around the exhaust louver 27 in a state where some of the document sheets shown in FIG. 6 have been conveyed. In FIG. 9, as in FIG. 6, solid line arrows represent the passage and the direction through and in which the document sheet is conveyed; outline arrows represent the path and the direction along and in which air is passed.

FIG. 6 shows a state where the document sheets have not been conveyed yet. A large number of document sheets D are placed on the document stacking tray 2, and thus the lift member 4 is located in a relatively low position. When the document conveying apparatus 1 is actuated as by pressing a "start to read" button to start to read image data from the document sheet D, the fan 34 rotates to cool the inside of the apparatus.

As described previously, the air discharged from the outlet 34b (see FIG. 2) of the fan 34 is discharged through the exhaust grill 35 out of the conveying unit 30, and is then blown through the exhaust louver 27 onto the downstream-side end face of the stack of the document sheets Dm on the document stacking tray 2. This makes float and thereby separate the topmost layer of the document sheets D.

Thereafter, as reading of image data from the document sheets D continues, the number of document sheets D stacked on the document stacking tray 2 decreases as shown in FIG. 9. The downstream end of the lift member 4 is raised with an unillustrated motor accordingly. With the downstream end of the lift member 4 raised, as shown in FIG. 9, the downstream-side end face of the lift member 4 blocks the exit of the exhaust louver 27. Thus, part of the air that is discharged through the exhaust louver 27 to the downstream-side end face of the document sheets Dm stacked on the document stacking tray 2 is blocked and thus is directed downward.

Outside the exhaust grill 35, below the exhaust grill 35 and the exhaust louver 27, the exhaust duct 26 is provided. The exhaust duct 26 is provided to permit the air discharged by the fan 34 through the exhaust grill 35 of the conveying unit 30 to be directed to the document ejection port 17 located in the downstream end of the document conveying passage 13.

As shown in FIG. 9, the air that is blocked at the exhaust louver 27 by the downstream-side end face of the lift member 4 and that is then directed downward is further guided downward to the document ejection port 17 through the exhaust duct 26.

While more document sheets are conveyed and the number of document sheets D on the document stacking tray 2 decreases, the number of document sheets D in the document ejection tray 3, from which image data has been read, increases. The document sheet D is pushed toward the document ejection tray 3 by the air that is discharged by the fan 34 and is then guided to the document sheet ejection port 17.

As described above, the fan 34 for cooling the inside of the document conveying apparatus 1 is provided so as to permit air to flow along the document conveying passage 13 on the air intake side of the fan 34 and so as to permit the air to be directed, on the air exhaust side of the fan 34, to the downstream-side end face of the stack of the document sheets Dm on the document stacking tray 2. Thus, it is possible to blow the air produced by the fan 34 onto the end face of the stack of document sheets Dm. This facilitates separation of the document sheets D, thus enhancing feeding performance. Hence, the stream of air produced by the fan 34 is used to enhance the performance with which the document sheets D are conveyed and also to facilitate separation of the document sheets D as they are fed into the apparatus.

The exhaust louver 27 is provided on the wall portion 28 located immediately on the downstream side of the downstream-side end face of the stack of document sheets Dm so as to permit the air discharged from the outlet 34b of the fan 34 to be directed to the downstream-side end face of the stack of document sheets Dm stacked on the document stacking tray 2. This makes it easier for the air blown by the fan 34 to flow to the end face of the stack of document sheets Dm. Thus, it is possible to strongly blow the air onto the end face of the stack of document sheets Dm, thereby further facilitating separation of the document sheets D. This helps achieve enhanced document feeding performance when the document sheets are fed into the apparatus.

At least part of the air that is discharged to the downstream-side end face of the stack of document sheets Dm on the document stacking tray 2 is passed to the document ejection port 17 through which the document sheet D is ejected into the document ejection tray 3 located on the downstream end of the document conveying passage 13. This makes it possible to further push, with the air discharged from the fan 34, the document sheet D into the document ejection tray 3 through the document ejection port 17. Thus, it is possible to prevent inconveniences such as one in which, when the document sheet D is about to be ejected into the document ejection tray 3, it gets stuck in the document ejection port 17 and is caught on the ejection roller 25a or the like disposed nearby to be eventually broken by being pulled in an unintended direction. Hence, it is possible to achieve enhanced feeding performance when the document sheets are fed into the apparatus, and also to prevent the document sheet D from breaking at the document ejection port 17.

The document stacking tray 2 and the document ejection tray 3 convey the document sheets D in opposite directions; the document stacking tray 2 is mounted on top of the document ejection tray 3; the document feed port 11 through which to feed the document sheets D from the document stacking tray 2 and the document ejection port 17 through which to eject the document sheets D into the document ejection tray 3 are formed on the same side of the trays and the document conveying passage 13 running from the document feed port 11 to the document ejection port 17 is curved in a U-shape in the up/down direction. Thus, in the document conveying apparatus 1 designed to be compact as described above, it is possible not only to cool the inside of the apparatus, but also to efficiently enhance the performance with which the document sheet D is conveyed. Hence, it is possible to greatly enhance document conveying stability.

It should be understood that the scope of the present invention is not limited to what has been specifically described above by way of embodiments, that is, many modifications and variations are possible without departing from the sprit of the present invention.

For example, although in the embodiments described above, the two fans 34 are separately arranged between adjacent rollers 20b, the number, arrangement, etc. of the fans 34 may be any other than those specifically described there.

The present invention finds applications in document conveying apparatuses in general that can be incorporated in image forming apparatuses.

What is claimed is:

1. A document conveying apparatus that separates and conveys one document sheet after another from a stack of document sheets placed on a document stacking tray to permit image data to be read from a document surface, the document conveying apparatus comprising:

a fan arranged at such an orientation as to pass air from an upstream side to a downstream side with respect to a document conveying direction to cool an inside of the document conveying apparatus, the air flowing along a document conveying passage on an air intake side and/or an air exhaust side of the fan, the air exhaust side of the fan pointing to a downstream-side end face of the stack of document sheets placed on the document stacking tray; and an exhaust louver provided on a wall portion located in a downstream-side vicinity of the downstream-side end face of the stack of document sheets, the exhaust louver permitting the air discharged from the fan to be directed to the downstream-side end face of the stack of document sheets placed on the document stacking tray.

2. A document conveying apparatus that separates and conveys one document sheet after another from a stack of document sheets placed on a document stacking tray to permit image data to be read from a document surface, the document conveying apparatus comprising:

a fan arranged at such an orientation as to pass air from an upstream side to a downstream side with respect to a document conveying direction to cool an inside of the document conveying apparatus, the air flowing along a document conveying passage on an air intake side and/or an air exhaust side of the fan, the air exhaust side of the fan pointing to a downstream-side end face of the stack of document sheets placed on the document stacking tray, at least part of the air discharged toward the downstream-side end face of the stack of document sheets placed on the document stacking tray being passed to a document ejection port located at a downstream end of the document conveying passage to permit the document sheets to be ejected therethrough into a document ejection tray.

3. A document conveying apparatus that separates and conveys one document sheet after another from a stack of document sheets placed on a document stacking tray to permit image data to be read from a document surface, the document conveying apparatus comprising:

a fan arranged at such an orientation as to pass air from an upstream side to a downstream side with respect to a document conveying direction to cool an inside of the document conveying apparatus, the air flowing along a document conveying passage on an air intake side and/or an air exhaust side of the fan, the air exhaust side of the fan pointing to a downstream-side end face of the stack of document sheets placed on the document stacking tray, an inlet of the fan pointing to part of the document surface lying in contact with an outer circumferential surface of a conveying roller located on the air intake side of the fan.

4. The document conveying apparatus of claim 3, wherein the conveying roller comprises a plurality of conveying rollers arranged in a document sheet width direction perpendicular to the document conveying direction, and the fan is arranged to pass air between two adjacent ones of the conveying rollers.

5. A document conveying apparatus that separates and conveys one document sheet after another from a stack of document sheets placed on a document stacking tray to permit image data to be read from a document surface, the document conveying apparatus comprising:

a fan arranged at such an orientation as to pass air from an upstream side to a downstream side with respect to a document conveying direction to cool an inside of the document conveying apparatus, the air flowing along a document conveying passage on an air intake side and/or an air exhaust side of the fan, the air exhaust side of the fan pointing to a downstream-side end face of the stack of document sheets placed on the document stacking tray, wherein an outlet of the fan points to a document ejection port located at a downstream end of the document conveying passage to permit the document sheets to be ejected therethrough into a document ejection tray, and an exhaust duct permits the air discharged from the fan to be directed downwards to the document ejection port.

6. A document conveying apparatus that separates and conveys one document sheet after another from a stack of document sheets placed on a document stacking tray to permit image data to be read from a document surface, the document conveying apparatus comprising:

a fan arranged at such an orientation as to pass air from an upstream side to a downstream side with respect to a document conveying direction to cool an inside of document conveying apparatus, the air flowing along a document conveying passage on an air intake side and/or an air exhaust side of the fan, the air exhaust side of the fan pointing to a downstream-side end face of the stack of document sheets placed on the document stacking tray, wherein the document stacking tray and a document ejection tray are arranged over each other, with respective document conveying directions thereof pointing in mutually opposite directions, a document feed port through which to feed the document sheet out of the document stacking tray and a document ejection port through which to eject the document sheet into the document ejection tray are formed at a same side of the document stacking tray and the document ejection tray, respectively, with respect to a document reading section, and the document conveying passage running from the document feed port to the document ejection port is curved to form a U-shape in an up and down direction.

* * * * *